(12) United States Patent
Zeng

(10) Patent No.: US 6,814,990 B2
(45) Date of Patent: Nov. 9, 2004

(54) BEVERAGE SYSTEM

(75) Inventor: Xiaoqing Suzy Zeng, Northfield, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 254 days.

(21) Appl. No.: 10/080,779

(22) Filed: Feb. 22, 2002

(65) Prior Publication Data

US 2003/0161912 A1 Aug. 28, 2003

(51) Int. Cl.$^7$ .............................. B65B 29/06; A23L 2/00
(52) U.S. Cl. .............................. 426/86; 426/87; 426/112; 426/115; 426/78; 206/217; 206/546
(58) Field of Search ................ 426/87, 112, 115, 426/86, 78, 120, 119; 206/217, 219, 221, 222, 223, 542, 545, 546, 547; 215/6; 99/284, 291, 316, 317, 323, 322

(56) References Cited

U.S. PATENT DOCUMENTS

| | | | |
|---|---|---|---|
| 1,770,118 A | * 7/1930 | Williams .................. 206/217 |
| 1,931,765 A | * 10/1933 | Leever .................... 426/78 |
| 3,121,636 A | * 2/1964 | Toms ...................... 426/86 |
| 3,414,414 A | * 12/1968 | Christine et al. ........ 426/122 |
| 3,620,759 A | * 11/1971 | Maddox .................. 426/78 |
| 3,743,520 A | * 7/1973 | Croner ................... 426/87 |
| 3,955,006 A | 5/1976 | Sokolsky et al. |
| 4,018,904 A | * 4/1977 | Muraoka ................. 426/115 |
| 4,076,207 A | 2/1978 | Austin |
| 4,103,802 A | 8/1978 | Piltz et al. |
| 4,114,784 A | 9/1978 | Hough et al. |
| 4,134,492 A | 1/1979 | Lucas |
| 4,186,215 A | * 1/1980 | Buchel ................... 426/86 |
| 4,232,502 A | 11/1980 | Lucas |
| 4,277,000 A | 7/1981 | Jaarsma |
| 4,495,404 A | * 1/1985 | Carmichael ............. 392/447 |
| 4,548,348 A | 10/1985 | Clements |
| 4,627,334 A | * 12/1986 | Shanklin ................ 99/306 |
| 4,703,849 A | 11/1987 | Vezirian et al. |
| 4,756,424 A | * 7/1988 | Schwartz ................ 206/542 |
| 4,934,525 A | * 6/1990 | Robinson ............... 206/217 |
| 5,180,079 A | 1/1993 | Jeng |
| 5,419,436 A | 5/1995 | Powell |
| 5,487,486 A | 1/1996 | Meneo |
| 5,673,789 A | * 10/1997 | Degraff-Eugene ...... 206/217 |
| 5,753,289 A | 5/1998 | Ness |
| 5,769,680 A | 6/1998 | Hoffman |
| 5,799,838 A | 9/1998 | Miller |
| 6,065,609 A | * 5/2000 | Lake ..................... 210/474 |
| 6,079,586 A | 6/2000 | Hanneman |
| 6,095,033 A | 8/2000 | Melton |
| 6,116,500 A | 9/2000 | Cahill |
| 6,180,149 B1 | * 1/2001 | Gramm ................. 426/394 |
| 6,263,923 B1 | * 7/2001 | Castillo ................. 141/100 |
| 6,363,978 B2 | * 4/2002 | Castillo ................. 141/100 |
| 6,382,411 B1 | * 5/2002 | Wentling ............... 206/217 |
| 2003/0077360 A1 | * 4/2003 | Ramon .................. 426/86 |

* cited by examiner

Primary Examiner—Milton I. Cano
Assistant Examiner—Robert A. Madsen
(74) Attorney, Agent, or Firm—Fitch, Even, Tabin & Flannery

(57) ABSTRACT

A portable beverage system is provided for allowing consumers to combine one or more portions of beverage or other concentrates with a liquid to form a drink. The system includes an inner storage container for the portions and an outer container for mixing the portions with a liquid. The portions may contain beverage concentrates, soup flavorings and spices, or nutritional additives, such as herbs, vitamins, and minerals. Different portions may be provided with system, allowing consumers to make drinks customizable according to personal preferences. The portions may be provided in capsules, gelatin compositions, or other forms.

16 Claims, 9 Drawing Sheets

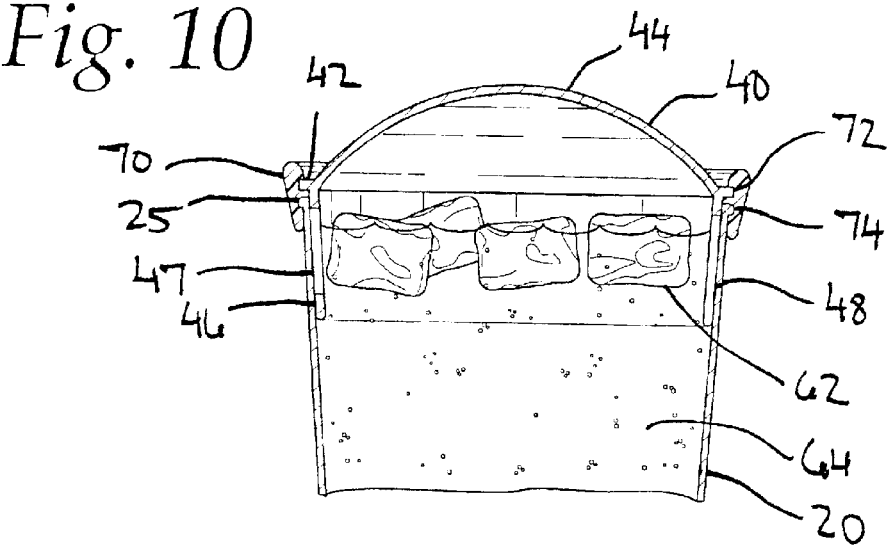
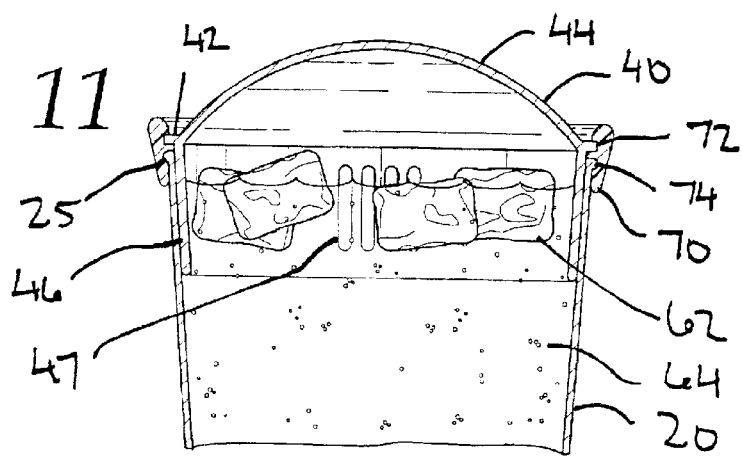
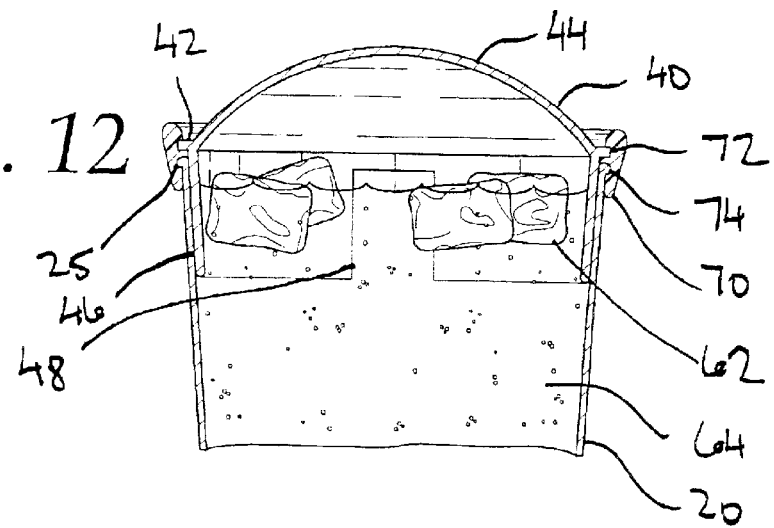

BEVERAGE SYSTEM

FIELD OF THE INVENTION

The invention relates generally to a beverage system, and particularly to a beverage system that includes a beverage concentrate in combination with a container for a beverage made from the concentrate.

BACKGROUND OF THE INVENTION

There are a wide variety of pre-made beverages available for purchase by consumers. Consumers can walk into almost any convenience store, grocery store, or gas station and select from a variety of different pre-made beverages. The available beverages often include carbonated sodas, mineral or other waters, and sport drinks. Natural juice beverages are also typically available and often have fruit juice content, such as orange juice, apple juice, and grapefruit juice.

More recently, so-called specialty drinks are becoming commonly available. One example of a specialty drink lists as its ingredients taurine, glucuronolactone, caffeine, B-complex vitamins, and carbohydrates. Other specialty drinks include various anti-oxidants and natural herbs. The variety of different specialty beverages offered is indicative of a desirability to provide drinks tailored specifically to the needs of individual consumers. The available types of readily consumable beverages, although numerous compared to the types of carbonated sodas available, are not numerous enough to address the need for a beverage that can be tailored and customized according to each individual's personal preferences. Thus, there is a need to provide consumers with beverages having ingredients such as flavorings, nutrients, vitamins, and herbs that are customizable according to individual consumer tastes, nutritional needs, and other preferences.

In addition to the pre-made beverages commonly available at convenience stores, grocery stores and markets offer a selection of powdered beverage concentrates to consumers. Powdered beverage concentrates may be combined with a liquid, typically water, to form a freshly made flavored beverage. Powdered beverage concentrates often are packaged either in large, multi-serving tubs or in individual packets or mini-tubs that correspond to a particular serving size. Packets of powdered beverage concentrates often are produced in a size that makes two quarts of flavored beverage when combined with water. Similarly, individual mini-tubs of powdered drink concentrates also typically combine with water to form two quarts of beverage. While these individual packets and mini-tubs can be more convenient for consumers to use compared to the beverage powder concentrates packaged in bulk, they still are typically intended primarily for home use. Due to the large volume of beverage, typically two quarts, that the contents of packets and mini-tubs make when combined with water, they may be impractical for use away from home.

Powdered beverage concentrates that combine with water to form two quarts of flavored beverage are also undesirable due to their large size because once made a consumer typically has no variety of flavor or taste. For example, a consumer may one day want to have a cherry flavored drink and then the next an orange flavored drink. Unless the consumer has several different two-quart pitchers, the two-quart size may restrict the consumer to first drinking multiple servings of one beverage flavor before washing the pitcher and making a different beverage flavor. Thus, it is desirable to provide consumers with a beverage that can be distributed in individual serving sizes so that consumers may make a large variety of customized drinks without having to have a large number of pitchers.

Furthermore, the two-quart size is inconvenient for consumers who want to make only a single serving of beverage at a particular time. The packets and mini-tubs typically cannot easily be resealed if a consumer only withdraws enough for a single serving. Large tubs are often resealable to allow consumers to withdraw only the amount of concentrate that they need. For example, a tablespoon or other portion of beverage concentrate may be combined with water in a glass or cup to form a single beverage serving. However, large tubs are disadvantageous because their size may render them inconvenient for a consumer to easily transport to the work place, school, etc. A consumer could attempt to put a single serving size of beverage powder in a reclosable plastic bag, but the powdered nature of beverage concentrates can make transfer and handling messy and inconvenient. Thus, there is a need for a more convenient system to provide consumers with single serving portions of a beverage concentrate.

While packaging powdered beverage concentrate in large tubs allows consumers to withdraw a desired portion of concentrate, such as single-serving portions, large tubs also allow consumers to withdraw imprecise amounts. Imprecise amounts of concentrate, when mixed with liquid, can result in flavor or other variations in the resulting beverage. For example, if too little of a portion of concentrate is combined with a given quantity of water, the resulting beverage may be diluted, having a watered-down flavor. Thus, it is desirable to provide consumers with single-serving portions of beverage concentrate that are packaged in relatively precise quantities.

U.S. Pat. No. 4,134,492, to Lucas, discloses a disposable coffee cup or container. The container has a beverage concentrate, such as instant coffee, in the bottom thereof. A thin film with a shape corresponding to the interior of the container is disposed in the container. The bottom of the film is elevated from the bottom of the container to hold the beverage concentrate therebetween and protect the beverage concentrate. To make a beverage, the film is removed from within the container, thereby exposing the beverage concentrate. Fluid can then be added to the beverage concentrate to form a beverage.

U.S. Pat. No. 4,232,502, also to Lucas, discloses a container and liner arrangement similar to that disclosed in U.S. Pat. No. 4,134,492 and discussed above. However, the bottom of the liner in U.S. Pat. No. 4,232,502 extends to the bottom of the container. The liner has one or more compartments or pockets formed therein for separating different beverage concentrates and holding them against the bottom of the container. Removal of the liner and addition of a liquid causes the different beverage concentrates to combine into a beverage.

There remains a need for a beverage system that allows for customization of the beverage by individual consumers.

SUMMARY OF THE INVENTION

In accordance with the invention, a method and apparatus are provided to enable consumers to conveniently prepare fresh, consistently flavored, single serving size beverages by using a portable beverage system. The beverages are customizable with regard to flavor and nutritional content according to the personal preferences of individual consumers.

In a preferred embodiment of the invention, the beverage system includes an outer container, an inner container that is sized to fit inside the outer container, one or more portions of concentrate, and a lid for fitting on the top of the outer container. The portions of concentrate may be provided in capsulated form. The inner container initially may be fitted inside the outer container. The inner container is capable of storing one or more beverage concentrate capsules within its interior. The inner container, with the capsules therein, is sealed within the outer container by securing the lid to the outer container. The compact, nestable design of the inner and outer containers contributes to the portability and convenience of the beverage system because users can transport the containers in their nested state, thereby reducing the size of the beverage system.

To use the beverage system of a preferred embodiment of the invention, the lid is removed from the outer container. Once the lid is removed from the outer container, the inner container with the beverage concentrate capsules therein can be removed from within the outer container. A consumer may then select one or more capsules from the inner container and place them in the outer container. Liquid, such as water, may be combined with the capsules in the outer container. To assist in the dissolution of the beverage concentrate into the liquid, the lid may be placed back on the outer container in a sealing manner and the outer container may be shaken. Alternatively, the lid can remain removed from the outer container and the consumer may stir the beverage concentrate and the liquid together with a spoon, straw, or other like instrument.

In a preferred embodiment of the invention, the inner container, outer container, and lid are preferably formed of a lightweight, inexpensive plastic material suitable for containing liquids for human consumption such that the containers are capable of inexpensive mass production. The plastic material is preferably microwavable to allow consumers to conveniently prepare hot beverages and also able to withstand both hot and cold temperature extremes. It is also preferable that the inner container, outer container, and lid be safe for cleaning in a dishwasher to enable consumers to conveniently wash the containers and lid. It is also preferable that the plastic material used for the containers and lid be scratch resistant so that the containers do not become visually unattractive or provide locations for bacteria or dirt to adhere. The inner container and outer container may be formed using any suitable manufacturing technique, such as injection molding or vacuum molding.

The containers can vary in size, shape, and appearance. In a preferred embodiment of the invention, the inner container and outer container each comprise a circular bottom wall and a sidewall that extends upward around the circumference of the bottom wall at a slightly obtuse angle. The angle of the sidewalls contributes to an overall drinking cup-like appearance of the containers. The upper circumferential edges of the sidewalls define openings or mouths of the containers.

The interior of the outer container is large enough to accommodate the inner container. It is preferable that the bottom wall of the inner container rest on the bottom wall of the outer container when inserted into the interior of the outer container. It is also preferable that the tapered diameter of the sidewall of the outer container be slightly larger than the tapered diameter of the inner container such that when the inner container is inside the outer container there is little space therebetween. The close sizing of the outer container with respect to the inner container is desirable to provide a relatively close fit when the two containers are nested together. The outer container may also be sized to be held in typical automobile cup holders to increase the convenience and portability of the beverage system.

The lid is preferably formed of the same material as the containers and is sized to fit in a sealing manner around the upper circumference of the sidewall of the outer container. The lid may have an arcuate profile to enhance its visual appeal. The lid may include openings for beverage to be dispensed through, such as a grated opening or a selectively closable nipple. The lid may engage the outer container with a snap-fit, or the lid may be provided with threads to enable it to screw on to corresponding threads provided in or on the outer container. A ring may be fitted around the outer circumference of the lid in order to assist in providing a tight fit between the lid and the upper circumference of the sidewall of the outer container. The ring may be integrally formed with the lid, or may comprise a separate piece. The ring may be formed of the same material as the lid. Alternatively, the ring may be formed of a material more elastic than the material forming the lid.

In a preferred embodiment of the invention, the portions of concentrate are in the form of a powder. The portions of concentrate may also be in a liquid form. The portions of beverage concentrate are preferably formed into capsules that are dissolvable in liquid or are easily broken apart to allow their contents to be emptied. The capsules may comprise cellulose or other easily dissolvable materials for containing the beverage concentrate. Ton an alternative embodiment of the invention, the portions of beverage concentrate are in the form of gelatin compositions. Whether the portions of concentrate are provided in capsules or comprise gelatin compositions, the portions can provide consumers with easily portable, single-serve portions of beverage concentrate. The portions may provide consumers with the precise amount of concentrate required for predetermined quantities of liquid, eliminated the need for consumers to measure the amount of concentrate necessary and resulting in consistently flavored beverages.

It is also preferable that the portions of concentrate remain cohesive and not degrade when exposed to a range of ambient temperatures. For example, it is contemplated that during use and storage of the portions of concentrate they may be exposed to a wide range of temperatures, such as in a closed vehicle in the summer heat, or in a vehicle exposed to frigid winter temperatures. By having the portions able to withstand a wide variety of temperatures without degradation, consumers are provided with a beverage system that is enhanced in portability.

The portions may include beverage concentrates with a wide variety of flavors. For example, fruit flavored beverage concentrates, such as orange, banana, and strawberry may be included in the portions. Some of the portions may contain other flavors, such as coffee or cappuccino. It is also contemplated that the portions may include teas, such as rosemary or jasmine, in concentrated form. Different groups or categories of beverage concentrate flavors may be packaged as refills or with the containers and lid of the beverage system of the invention. For example, a consumer may be provided with a selection of general flavor categories, such as tea, citrus fruit juice, or other sets. Each category may include multiple flavors. For example, the citrus fruit juice set may include orange, grapefruit, lemon, and lime flavors. Providing different flavorings of the portions of concentrate allows consumers to conveniently create a wide variety of freshly made drinks when desired.

Nutritional additives, such as vitamins, herbs, and minerals, may also be provided in portions designed to be easily dissolvable in liquid. The nutritional additives may be combined with beverage concentrate in the portions. Alternatively, the nutritional additives may be provided in capsules or other forms independent of the beverage concentrate. For example, one capsule could contain vitamin C, and another could contain zinc. Various nutritional additives may also be provided in combination within a single portion or capsule. The combination portions can have ingredients chosen according to themes. The provision of nutritional additives in capsule or other forms allows the consumer to easily customize the nutritional content of a beverage made with the beverage system of the invention according to personal preferences.

In addition to portions or capsules containing beverage concentrate and/or nutritional additives, portions may be provided containing other consumable items. For example, in an embodiment of the invention the portions may include soup concentrate. The soup concentrate can contain flavoring and spices for combination with liquid to form a soup. Portions or capsules may also be provided that contain carbonation elements, such as sodium bicarbonate, in order to provide carbonation to beverages made with the beverage system of the invention. Wellness portions or capsules, containing such over the counter remedies as Tums or Altoids, may also be provided to allow consumers to customize drinks made with the beverage system. The portions may also contain colorings or dyes for producing beverages of desired colors or appearances.

Portions, whether in capsule or other form, may by uniquely shaped to allow consumers to easily distinguish and select the portions with the contents they desire from a plurality of different portions. For example, capsules containing beverage concentrate may be shaped according to their flavor, such as round-shaped for orange flavor, crescent-shaped for banana flavor, or heart-shaped for strawberry flavor. The portions may also be provided in different shapes to assist consumers in distinguishing among portions with different contents. For example, orange flavor capsules may be colored orange, banana flavor capsules may be colored yellow, and strawberry flavor capsules may be colored red. If the portions are provided in capsule form, then the capsules may be clear or transparent to increase their visual appeal. Scents can also be added to the portions to help consumers distinguish between flavors.

The inner container, outer container, and lid may be formed of a translucent material. In addition to providing an appealing appearance to consumers, having the containers and lid formed of a translucent material allows for a consumer to easily see inside one or both of the containers. Such visibility allows a consumer to see how many capsules or portions are contained within the inner container, even when the inner container is nested within the outer container. A translucent material also allows the consumer to visually determine whether a capsule or portion has been fully dissolved when combined with a liquid in the outer container. Forming the inner container, outer container, and lid of a translucent material thus contributes to the overall ease with which a consumer can use the beverage system of the invention.

To assist consumers in mixing portions of concentrate or other ingredients with a liquid, such as water, the outer container may have indicia printed or formed on its sidewall to indicate the appropriate amount of liquid to be added for given types or quantities of portions. The indicia can assist consumers in mixing portions and liquid to provide consistently flavored beverages. For example, the indicia may include a scale with marks at locations on the scale for indicating how much liquid should be added for a specific quantity of capsules. The indicia may also include one or more recipes of proposed combinations of portions or capsules. For instance, the recipe may suggest combining a juice capsule, a vitamin capsule, and carbonation capsule to form a nutritional, carbonated juice drink. Alternatively, such recipes may be printed on packaging or instructions sheets included with the beverage system.

BRIEF DESCRIPTION OF THE DRAWINGS

FIG. 10 is a partial sectional view of the container of FIG. 6 taken along line 10—10 thereof;

FIG. 11 is a partial sectional view of the container of FIG. 7 taken along line 11—11 thereof;

FIG. 12 is a partial sectional view of the container of FIG. 7 taken along line 12—12 thereof;

DETAILED DESCRIPTION OF PREFERRED EMBODIMENTS

Figure 1:
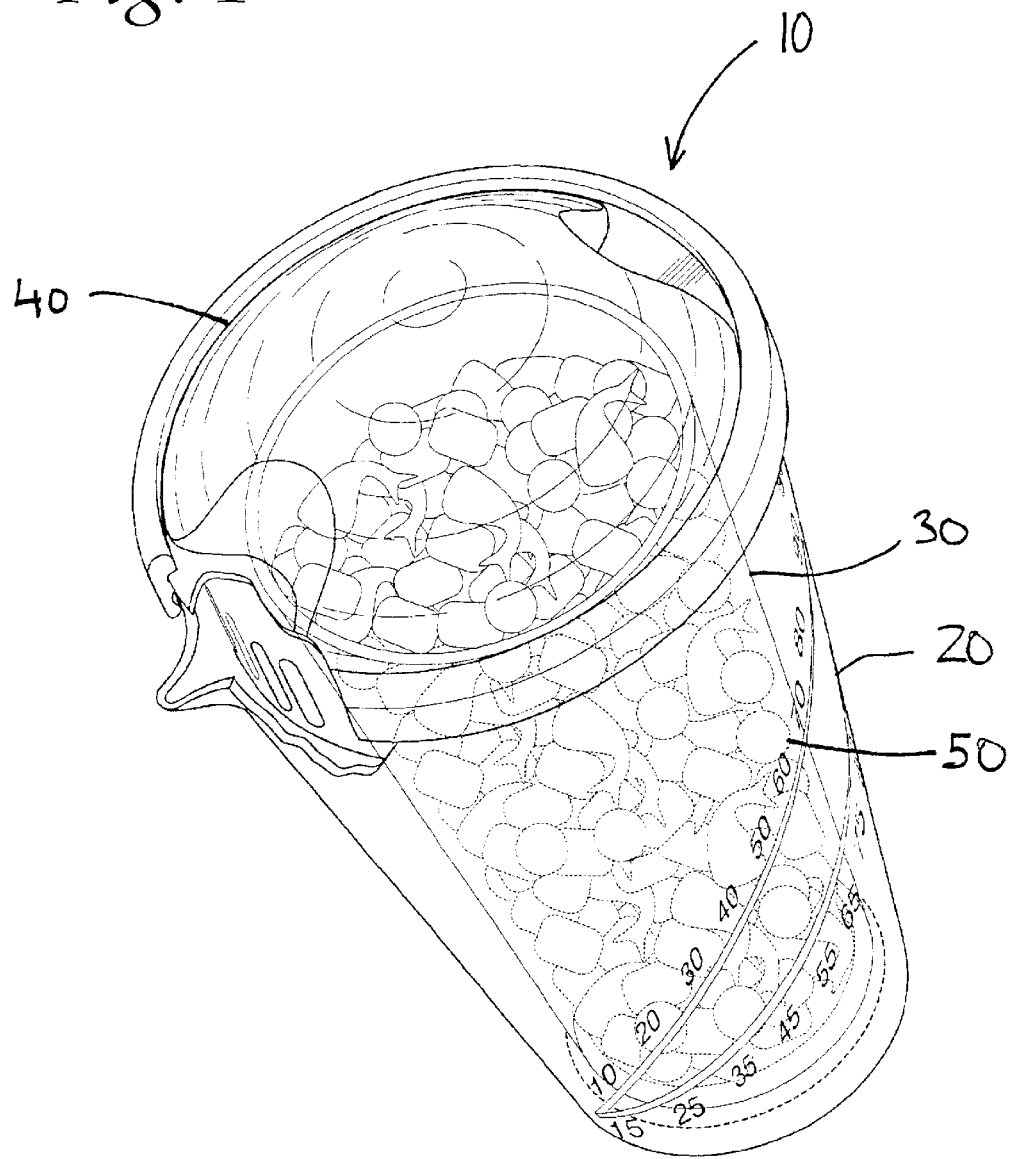
FIG. 1 is a perspective view of the beverage system in accordance with an embodiment of the invention.

The invention is preferably embodied in a method an apparatus that enables consumers to conveniently prepare freshly-made beverages in convenient single-serve portions that are customizable according to individual customer preferences by using a portable beverage system 10. A preferred embodiment of the invention, wherein the beverage system 10 includes portions of concentrate contained in capsules 50, a mixing and serving container 20, a lid 40, and a capsule storage container 30, are disclosed below.

FIGS. 1–14 illustrate apparatus for providing consumers with a convenient, portable, and customizable beverage system 10 in accordance with embodiments of the invention. The beverage system 10 includes at least one portion or capsule 50 containing beverage concentrate, an outer container for mixing and serving a beverage 64, an inner container 30 for storing the capsules 50, and a lid 40 for the outer container 20. The inner container 30 can be placed inside the outer container 20 to increase the compactness of the beverage system 10 and to store any capsules 50 held therein. The lid 40 can seal the contents of the outer container 20, which may include either a beverage 64 or the inner container 30 and capsules 50.

In an embodiment of the method of the invention, illustrated in FIGS. 1–7, the beverage system 10 allows consumers to easily make a customizable beverage 64 according to personal preferences. The lid 40 can be removed from the outer container 20 to allow the inner container 30, with capsules 50 therein, to be withdrawn. One or more beverage capsules 50 may then be selected from the inner container 30 and deposited within the outer container 20. The outer container 20 is then filled with liquid 60, such as water. Next, the lid 60 is secured to the outer container to seal the liquid 60 and the capsules 50 inside. When the lid 40 is securely on the outer container 20, the outer container 20 can be shaken to dissolve the capsule 50 in the liquid 60 and produce a beverage 64. After dissolution of the capsule 50 in the liquid 60, the freshly prepared, custom beverage 64 is ready for serving. The method of making the beverage 64 is described in more detail hereinbelow.

An embodiment of the invention is illustrated in FIG. 1, showing the beverage system 10 comprising an inner container 30 with capsules 50 therein and disposed within the outer container 20, and a lid 40 sealing the inner container 30 and the capsules 50 within the outer container 20.

Beverage concentrate is provided in the form of portions or capsules 50 that can be mixed with a liquid 60 to form a flavored beverage 64. The portions or capsules 50 may also contain vitamins, herbs, or other nutrients to allow consumers to selectively add nutrients to the flavored beverage 64 to create a customizable beverage 64. The capsules 50 may be distinguishably shaped to allow consumers to differentiate between flavors of drink concentrates or nutrient contents. For example, a whale-shaped capsule 66 may contain a first flavor of beverage concentrate, and a spherically-shaped capsule 68 may contain a second flavor of beverage concentrate.

Figure 15:
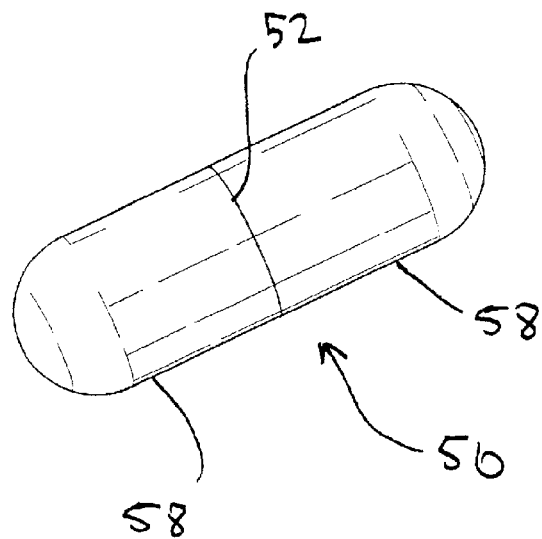
FIG. 15 is a perspective view of a capsule in accordance with an embodiment of the invention.
Figure 16:
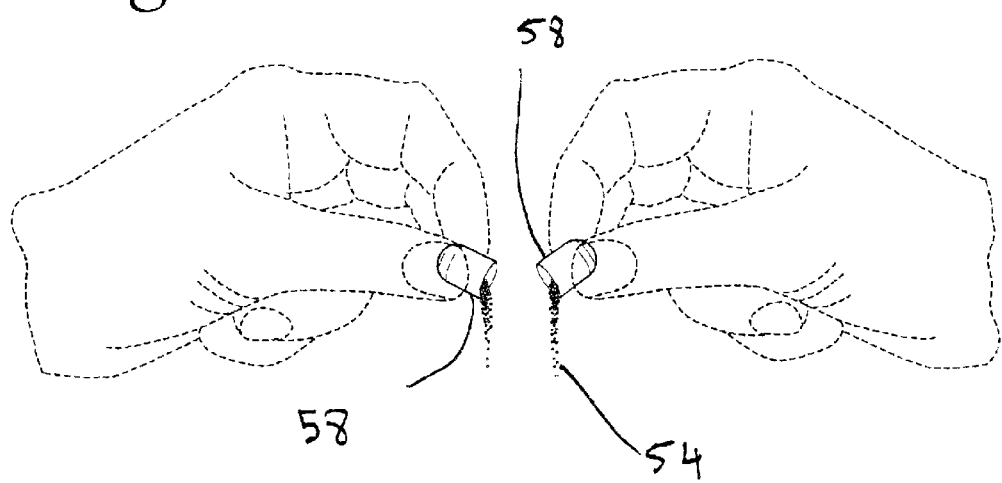
FIG. 16 is an perspective view of the capsule of FIG. 15 being separated.

In an embodiment of the invention, the beverage capsules 50 contain powdered beverage concentrate 54. The powdered beverage concentrate 54 is dissolvable in water or other liquids 60 to form a flavored beverage 64. In an embodiment of the invention, the beverage capsules 50 comprise an outer portion 58 for containing the powdered beverage concentrate 54. The outer portion 58 may be dissolvable in liquid 60 to allow access to the powdered concentrate 54 contained therein. Alternatively, the outer portion 58 may have an area of weakness 52 to allow the-outer portion 58 to be split open to allow access to the powdered beverage concentrate 54 contained therein, as illustrated in FIGS. 15 and 16. In another embodiment of the invention, the beverage portions 50 are formed of a gelatin 56 that is dissolvable in liquid 60 to form a flavored beverage 64.

The outer container 20 comprises a circular bottom wall 22 with a cylindrical sidewall 24 extending upwardly therefrom. The sidewall 24 extends upwardly at a slight obtuse angle with respect to the bottom wall 22 to present an attractive container similar to a drinking glass. A lip 25 may be formed around the periphery of the sidewall 24 of the outer container 20 opposite the bottom wall 22. Indicia 26, such as a scale indicating the amount of liquid to be added for a given number of capsules 50, may be printed on the sidewall 24 of the outer container 20. Alternatively, the indicia 26 may be formed in either a depressed or raised manner on the surface of the sidewall 24 of the outer container 20. A pour spout may also be formed in the sidewall of the outer container to facilitate the pouring of a beverage 64 from within the outer container 20.

Figure 2:
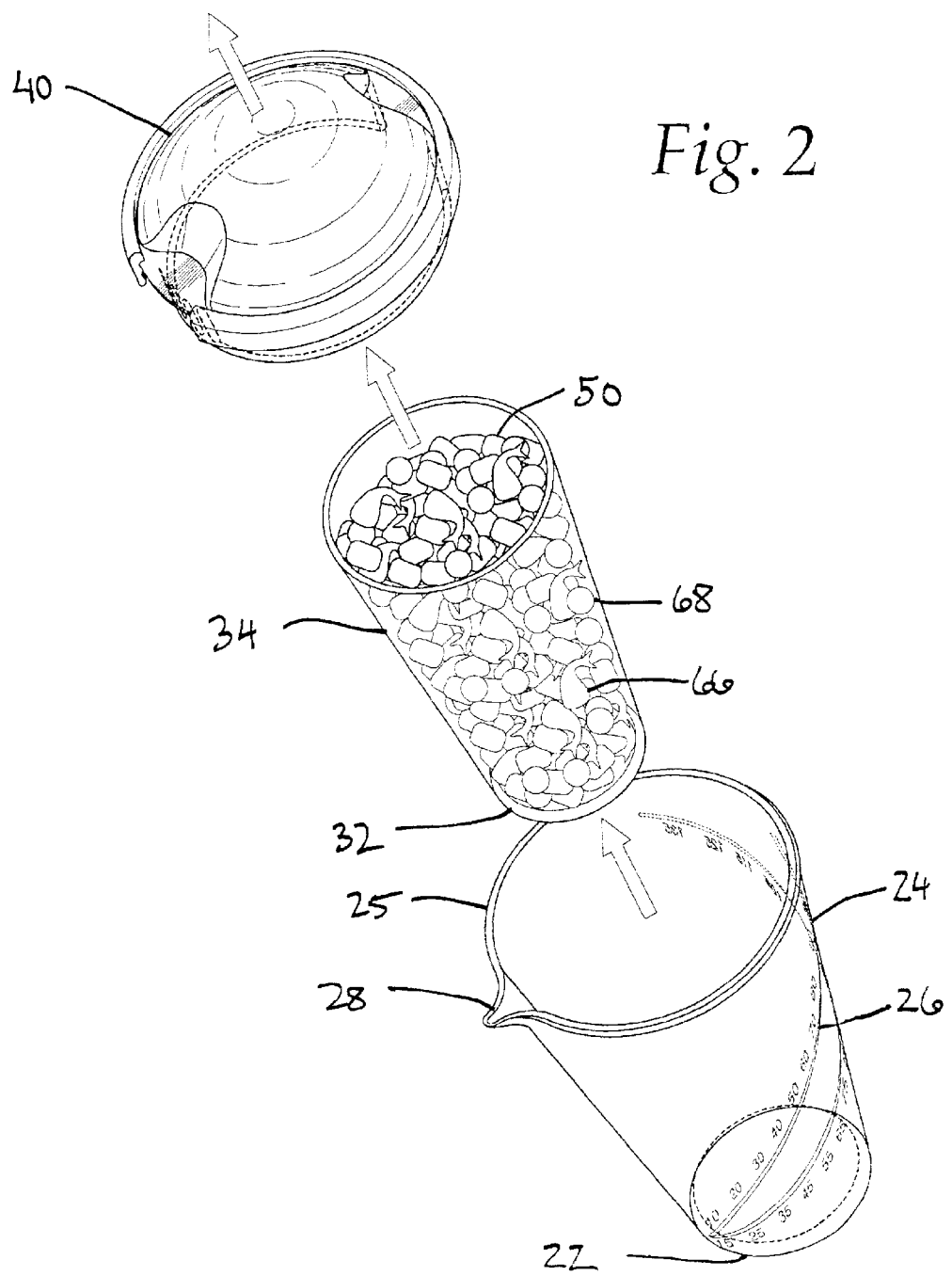
FIG. 2 is a perspective view of the beverage system of FIG. 1 with the lid and inner container being removed from the outer container.
Figure 3:
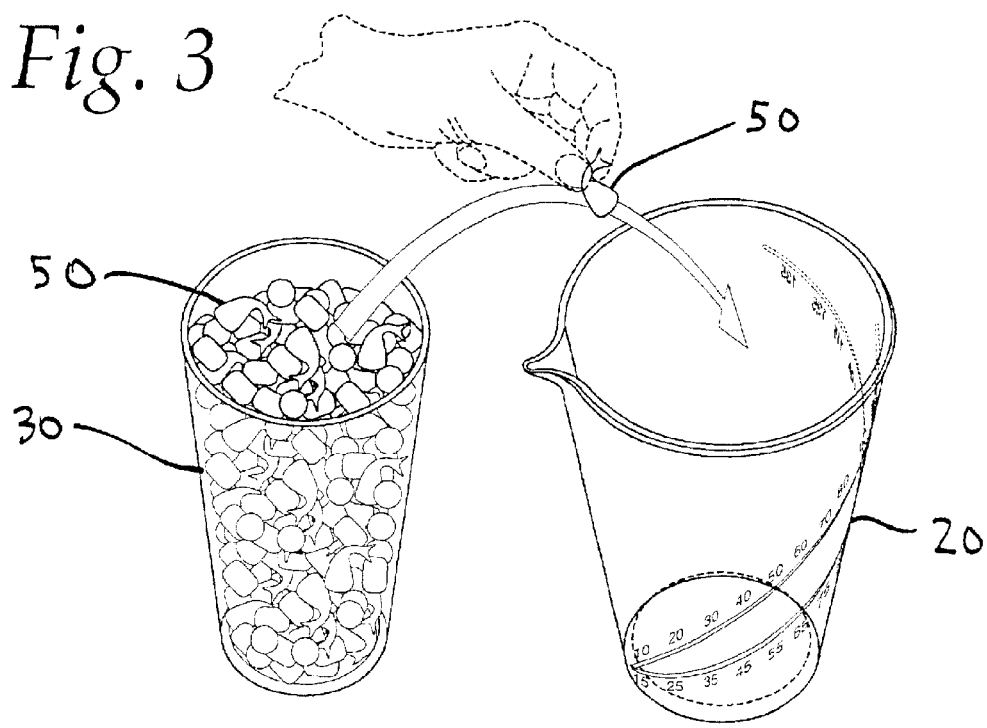
FIG. 3 is a perspective view of the beverage system of FIG. 1 with a capsule being removed from the inner container and placed in the outer container.

The inner container 30, illustrated in FIGS. 1–3, comprises a circular bottom wall 32 and a cylindrical sidewall 34 extending upwardly therefrom. Similar to the sidewall 24 of the outer container 20, the sidewall 34 of the inner container 30 extends upwardly at a slight obtuse angle with respect to the bottom wall 32. The inner container 30 is sized to fit within the outer container 20. It is desirable that the inner container 30 fit within the outer container 20 loosely, so that it is easily withdrawn and replaced. However, it is also desirable that the fit between the inner container 30 and the outer container 20 should not be so loose to cause excessive rattling or shaking of the inner container 30 against the interior surfaces of the outer container 20.

The lid 40 is sized to fit in a sealing manner onto the peripheral edge or lip 25 of the sidewall 24 of the outer container 20. In a preferred embodiment of the invention, the lid 40 comprises an circular, dome-shaped top wall 44 with a sidewall 46 depending downwardly from its periphery, as generally shown in FIG. 2. When the lid 40 is placed on the outer container, the sidewall 46 extends downwardly into the outer container 20 in close relation with the sidewall 24 of the outer container 20.

Figure 8:
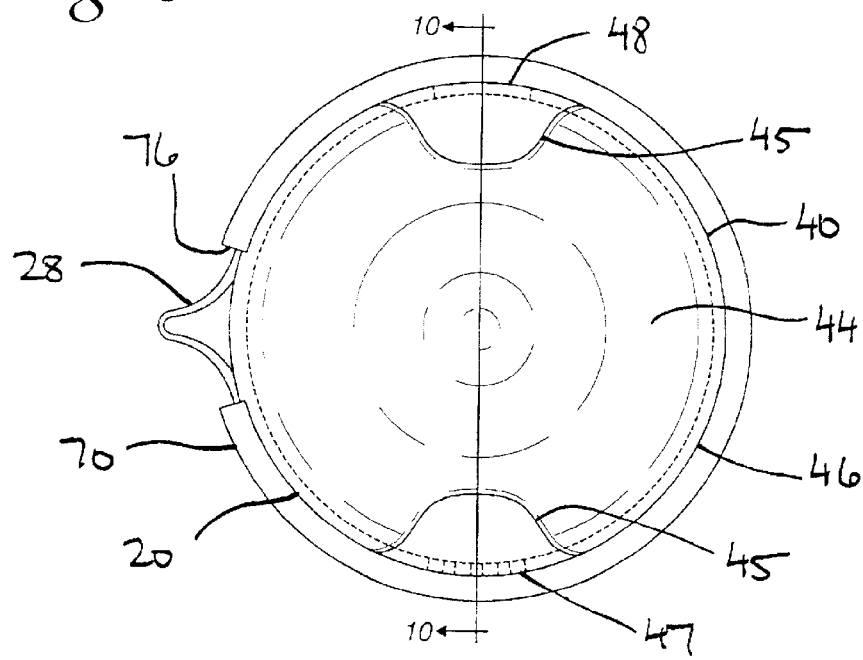
FIG. 8 is a plan view of the top of the container of FIG. 1 with the lid thereon in a closed position.
Figure 9:
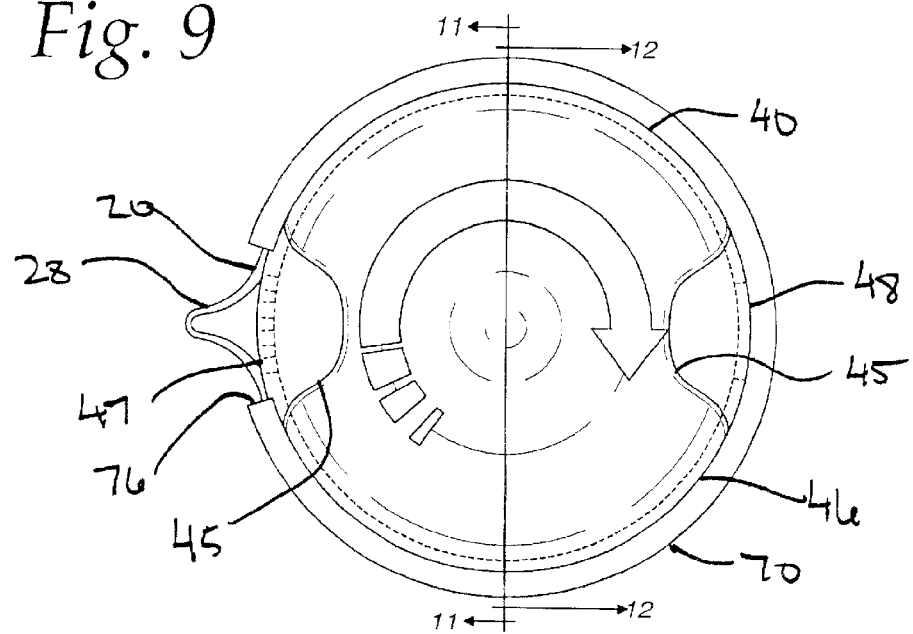
FIG. 9 is a plan view of the top of the container of FIG. 8 with the lid being rotated to a pouring position.
Figure 13:
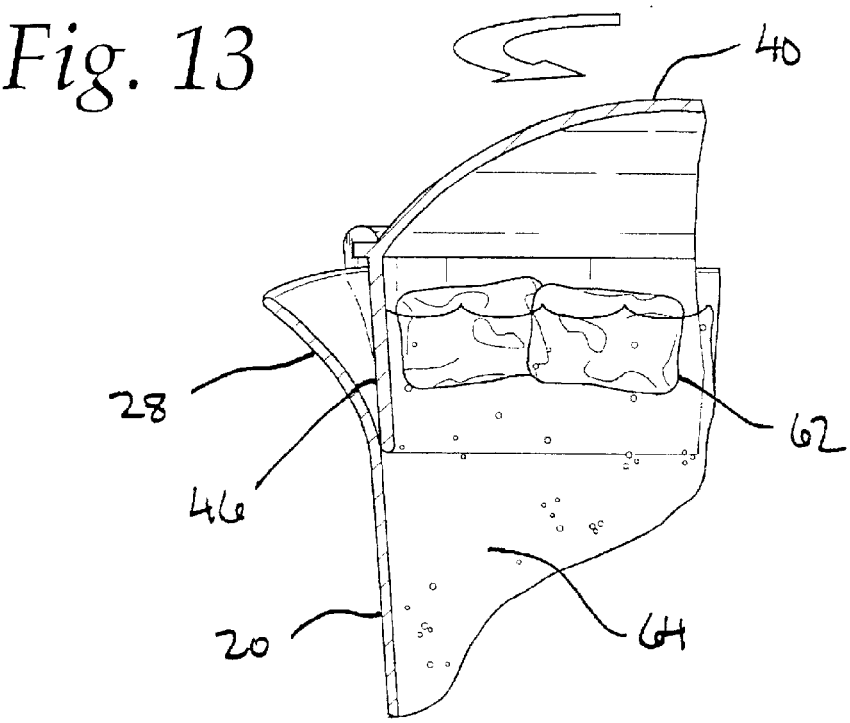
FIG. 13 is a partial sectional view of the container of FIG. 7 taken along line 13—13 showing the lid being rotated from a closed position.
Figure 14:
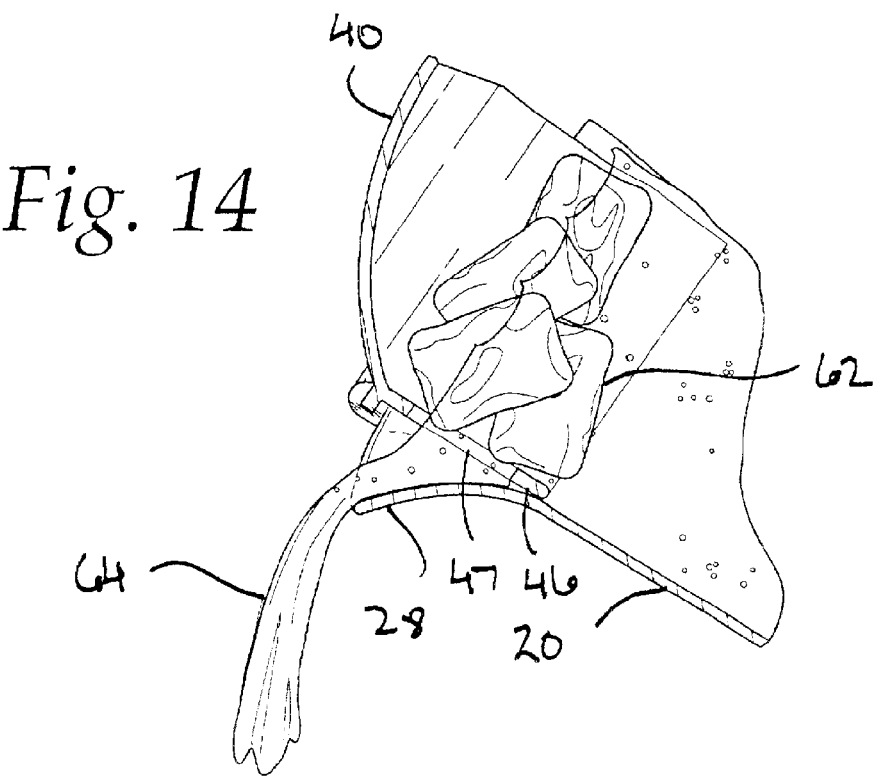
FIG. 14 is a view of the container similar to FIG. 13 showing the lid in a pouring position.

The sidewall 46 of the lid 40 may have one or more openings 48 for allowing the contents to be poured from the outer container 20 with the lid 40 attached. The opening 48 in the sidewall 46 of the lid 40 may be arranged to allow the contents of the outer container 20 to be dispensed through the opening 48 when aligned with the pour spout 28 of the outer container 20, as illustrated in FIG. 14. The opening 48 in the sidewall 46 of the lid 40 may include grate openings 47 configured to let liquid 60 pass therethrough but preventing solids, such as ice 62, from passing therethrough, as illustrated in FIG. 14. Indentations 45 may be formed in the top wall 44 of the lid 40 to provide surfaces for consumers to grip and rotate the lid 40 when the lid 40 is secured to the outer container 20, such as shown in FIGS. 8 and 9. When the indentations 45 are aligned with the openings 48 or 47 of the sidewall 46 of the lid 40, the indentations 45 can serve as indicia for determining the location of the openings 48 or 47 when the lid 40 is secured to the outer container 20.

In an embodiment of the lid 40, a ring 70 is disposed around the periphery of its top wall 44. The ring has a groove 72 formed around its inner side for engaging the lip 25 of the outer container 20 in an interlocking manner. The securing of the lid 40 to the outer container 20 via the groove 72 in the ring 70 and the lip 25 of the sidewall 24 of the outer container 20 provides a seal to close the interior of the outer container 20. The ring 70 may be made of a plastic material similar to the material of the lid 40, or the ring 70 may be made of a more elastic material to provide for a tight seal between the groove 72 of the ring 70 and the lip 25 of the outer container 20. The ring 70 may completely surround the periphery of the top wall 44 of the lid 40, or the ring 70 may form only a partial circle, as illustrated in FIGS. 8 and 9. It the ring 70 forms only a partial circle, it is preferable that the gap 76 in the ring 70 be aligned with the pour spout 28 of the outer container 20 to facilitate the pouring of the contents from the outer container 20.

The ring 70 may be integrally formed with the lid 40, or the ring 70 may comprise an additional part attached to the lid 40. As illustrated in FIGS. 10–12, the lid 40 may be provided with a protrusion 42 extending outwardly proximate the intersection of the top wall 44 and the sidewall 46 of the lid. The ring 70 may be provided with a groove 74 around its inner circumference corresponding to the profile of the protrusion 42 in order to assist in securing the ring 70 to the lid 40. The ring 70 may be securely attached to the lid 40 via its groove 74 and the protrusion 42 of the lid 40. Alternatively, the lid 40 may be adapted for rotation with respect to the ring 70, as shown in FIGS. 8 and 9.

The outer container 20, inner container 30, and lid 40 may all be made of the same material. It is preferably that the outer container 20, inner container 30, and lid 40 each be transparent. A transparent outer container 20 and inner container 30 allows their contents to be viewed by consumers. For example, when the inner container 30 is disposed within the outer container 20, each container's transparency allows consumers to readily view the number of capsules 50 disposed within the inner container 30. When the outer container 20 is used to mix a beverage capsule 50 with a liquid, the transparency of the outer container 20 and the lid 40 allows consumers to readily ascertain whether the capsule 50 and/or its contents are fully dissolved in the liquid 60.

In accordance with a method of the invention, the beverage system 10 shown in FIG. 1 and described above is used to form a beverage 64, as illustrated in FIGS. 1–7. The components of the beverage system 10 discussed above, including the outer container 20, inner container 30, lid 40, and beverage portions 50, may be combined together to form a compact state that may be conveniently portable by consumers. In the initial compact state of the beverage system 10, illustrated in FIG. 1, portions 50 are stored in the inner container 30. The inner container 30 is disposed within the outer container 20. The lid 40 is attached to the outer container 20, thereby securing the inner container 30 and portions 50 within the outer container 20. The lid 40 may be attached in sealing relation with the outer container 20 to maintain the freshness of the portions 50 stored within the inner container 30.

In order to make a beverage 64 using the beverage system 10, illustrated in FIG. 1, the components of the beverage system 10 are separated from their compact state. The lid 40 is first removed from the outer container 20 to allow the inner container 30, containing the beverage portions 50, to be withdrawn from inside the outer container 20, as shown in FIG. 2. Once the inner container 30 is removed from the outer container 20, one or more beverage portions 50 can be selected by the consumer from the inner container 30, and placed in the outer container 20, as shown in FIG. 3.

Figure 4:
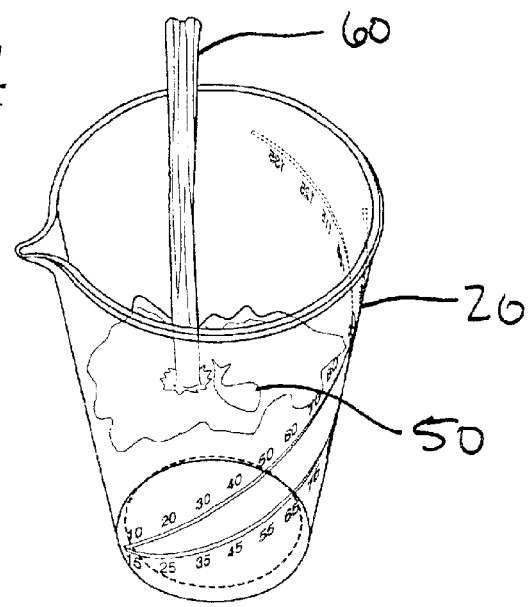
FIG. 4 is a view of the outer container of FIG. 3 with liquid being added to the outer container with the capsule therein.
Figure 5:
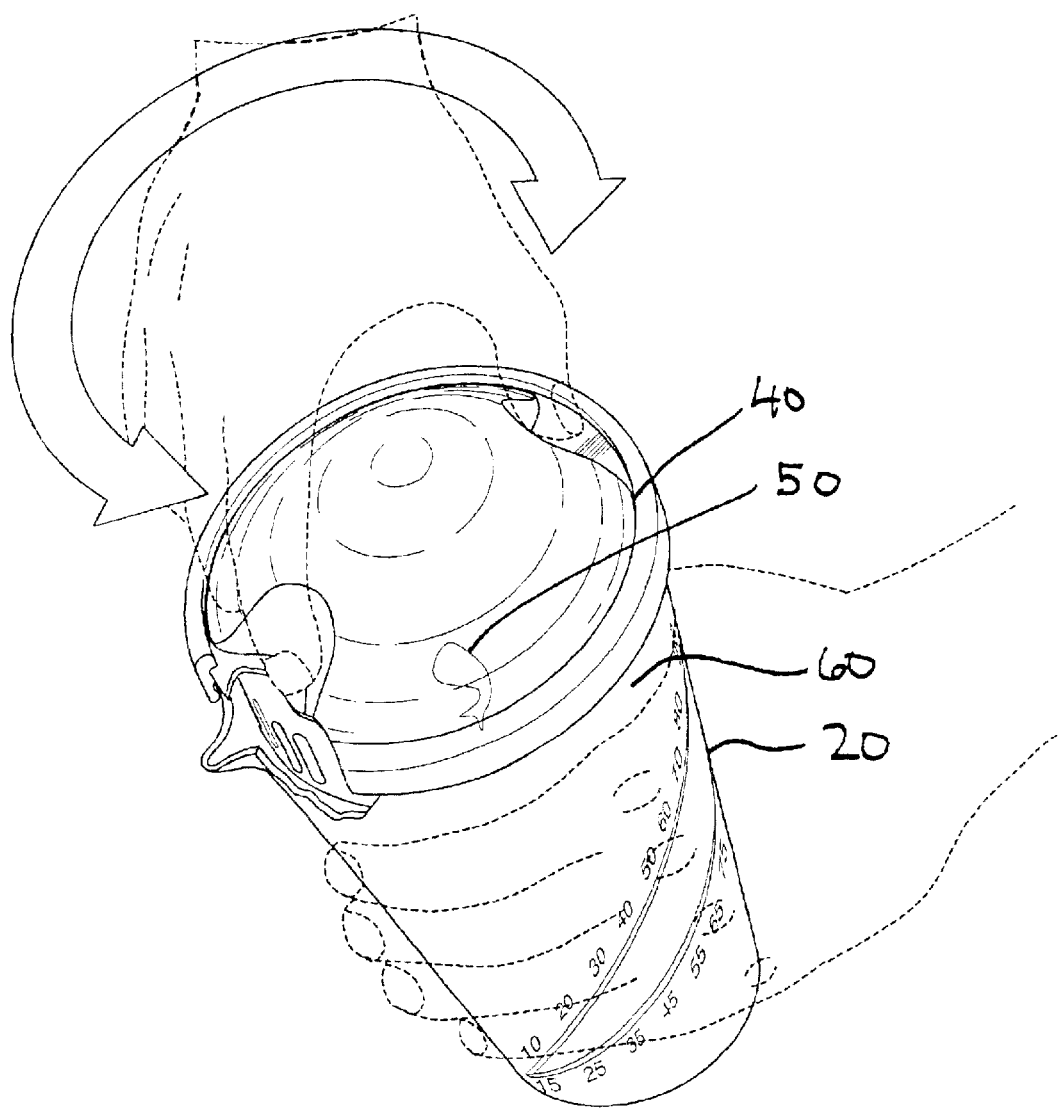
FIG. 5 is a view of the outer container of FIG. 4 with the lid being placed on the outer container having the liquid and the capsule therein.
Figure 6:
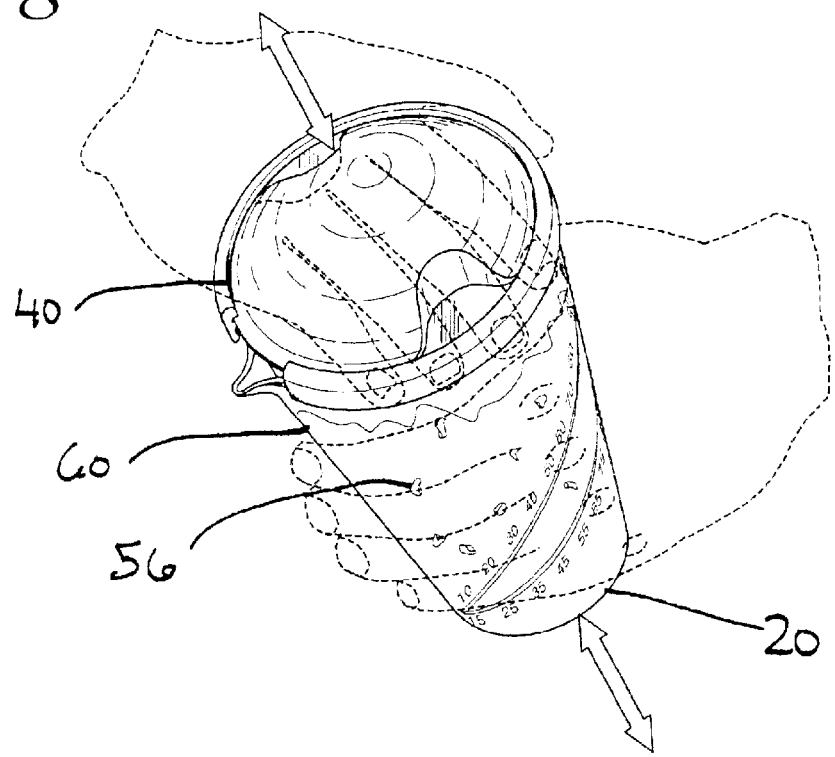
FIG. 6 is a view of the outer container of FIG. 5 with the outer container having the lid thereon being shaken.
Figure 7:
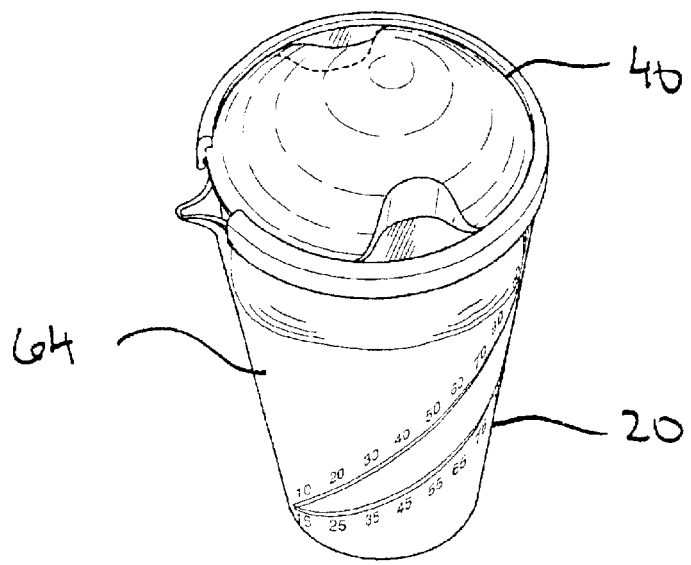
FIG. 7 is a view of the outer container of FIG. 6 with the lid thereon and the capsule dissolved in the liquid.

Once the portion 50 is placed in the outer container 20, a liquid 60, such as water, can be combined with the portion 50 in the outer container 20, as shown in FIG. 4. Indicia 26 located on the outer container 20 may be used to determine the appropriate amount of liquid 60 to add for given types or quantities of capsules 50. Next, a consumer can securely attach the lid 40 to the outer container 20 to seal the liquid 60 and capsules 50 therein, as shown in FIG. 5. With the lid 40 attached to the outer container 20, the outer container 20 can be shaken by a consumer to break apart and dissolve the portion 50 into the liquid 60, as shown in FIG. 6. When the portion 50 is dissolved in the liquid 60, the consumer is presented with a freshly made, customized beverage 64, as shown in FIG. 7.

Various modifications to the above-discussed steps are contemplated by the invention. For example, the outer container 20 may not require shaking to dissolve the portion 50 in the liquid 60. If the break-apart capsule 50 described above is used, the capsule 50 can be separated along its area of weakness 52 and the powdered beverage concentrate 54 dispensed directly into the liquid 60. Alternatively, a drinking straw or other utensils (not shown) may be used to assist in dissolving the water soluble capsules 50 and powdered beverage concentrate 54 or the gelatin concentrate 50 into the liquid 60.

The beverage system 10 discussed above provides consumers various ways to consume a beverage 64 made with the beverage system 10. For example, the lid 40 can be removed from the outer container 20 and the consumer can drink the beverage 64 directly from the outer container 20. Alternatively, the lid 40 can be rotated with respect to the outer container 20 to align either the opening 48 or the grate openings 47 with the pour spout 28 and the beverage 64 poured from the outer container 20 into a glass or other drinking container (not shown). A straw opening (not shown) may also be provided in the lid 40 to allow consumers to drink the beverage 64 directly from the outer container via a straw (not shown).

From the foregoing, it will be appreciated that the invention provides a method and apparatus for consumers to create a freshly prepared, customized beverage using a convenient and portable beverage system 10. The invention is not limited to the embodiments described hereinabove or to any particular embodiments. Various modifications to the aforementioned containers 20 and 30, beverage portions 50, or other components will result in substantially the same invention.

The invention is defined more particularly by the following claims.

What is claimed is:

1. A beverage system comprising:
   a plurality of capsules each containing an individual single-serving size portion of flavored beverage concentrate capable of being combined with liquid to make a beverage, said plurality of capsules including at least two different capsules containing different portions of flavored beverage concentrates capable of making different beverages, the at least two different capsules being visually distinguishable;
   an outer cup having a bottom wall and a side wall defining an opening opposite the bottom wall, said outer cup being capable of serving said beverage;
   an inner cup having a bottom wall and a sidewall defining an opening opposite the bottom wall, said inner cup being removably disposed within said outer cup, said inner cup containing said plurality of capsules; and
   a removable lid disposed on said outer cup to contain said inner cup and said plurality of capsules, said lid having a first configuration when secured to said outer cup that prevents the beverage from exiting the outer cup and a second configuration when secured to said outer cup that permits the beverage to exit the outer cup, said lid being rotatable relative to said outer cup between the configuration permitting the beverage to exit said outer cup and the configuration preventing the beverage from exiting said outer cup.

2. The beverage system of claim 1 wherein said capsules comprise flavored beverage concentrates.

3. The beverage system of claim 1 wherein said capsules comprise flavored soup concentrates.

4. The beverage system of claim 1 wherein said capsules comprise gelatin compositions.

5. The beverage system of claim 1 wherein said outer cup has measuring indicia thereon.

6. The beverage system of claim 1 wherein said outer cup and said inner cup are formed of a translucent polymer.

7. The beverage system of claim 1 wherein said capsules are translucent.

8. The beverage system of claim 1 wherein said capsules include nutritional supplements.

9. The beverage system of claim 1 wherein said capsules comprise concentrated coffee.

10. The beverage system of claim 1 wherein said capsules comprise concentrated tea.

11. The beverage system of claim 1 wherein said capsules are dissolvable in liquid.

12. The beverage system of claim 1 wherein said capsules can be opened to allow said portions to be added into said outer cup.

13. The beverage system of claim 12 wherein said capsules comprise two halves joined at an area of weakness.

14. The beverage system of claim 1 wherein said capsules are dissolvable in liquid.

15. The beverage system of claim 1 wherein said at least two different types of capsules each capable of making a different beverage are differently shaped in order to allow differentiation between the capsules.

16. The beverage system of claim 1 wherein said lid has a first configuration when secured to said outer cup that prevents the beverage from exiting the outer cup via a pour spout in the outer cup and a second configuration when secured to said outer cup that permits the beverage to exit the outer cup via the spout.

* * * * *